US012322892B2

(12) United States Patent
Lee et al.

(10) Patent No.: US 12,322,892 B2
(45) Date of Patent: Jun. 3, 2025

(54) ELECTRICAL CONNECTOR HAVING TERMINAL POSITION ASSURANCE

(71) Applicant: Tyco Electronics AMP Korea Co., Ltd., Gyeongsan (KR)

(72) Inventors: Chang-Ho Lee, Gyeongsan-si (KR); Keun Taek Lim, Gyeongsan-si (KR)

(73) Assignee: Tyco Electronics AMP Korea Co., Ltd., Gyeongsan (KR)

( * ) Notice: Subject to any disclaimer, the term of this patent is extended or adjusted under 35 U.S.C. 154(b) by 421 days.

(21) Appl. No.: 17/747,332

(22) Filed: May 18, 2022

(65) Prior Publication Data

US 2022/0376424 A1 Nov. 24, 2022

(30) Foreign Application Priority Data

May 18, 2021 (KR) ........................ 10-2021-0064156
Apr. 14, 2022 (KR) ........................ 10-2022-0046463

(51) Int. Cl.
*H01R 13/424* (2006.01)
*H01R 13/00* (2006.01)

(52) U.S. Cl.
CPC .................................. *H01R 13/424* (2013.01)

(58) Field of Classification Search
CPC .............. H01R 13/424; H01R 13/4362; H01R 2201/26
See application file for complete search history.

(56) References Cited

U.S. PATENT DOCUMENTS

| | | | | | |
|---|---|---|---|---|---|
| 4,607,903 | A * | 8/1986 | Hoshino | H01R 13/6271 | 439/372 |
| 4,679,874 | A * | 7/1987 | Saijo | H01R 13/422 | 439/595 |
| 4,767,361 | A * | 8/1988 | Hoshino | H01R 13/422 | 439/597 |
| 4,979,913 | A * | 12/1990 | Aiello | H01R 13/422 | 439/597 |
| 5,044,972 | A * | 9/1991 | Ikeda | H01R 13/20 | 439/752 |
| 5,647,775 | A * | 7/1997 | Polgar | H01R 13/4361 | 439/752 |
| 6,093,063 | A * | 7/2000 | Tsuji | H01R 13/4361 | 439/752 |
| 11,201,428 | B2 * | 12/2021 | Martinez Millan | H01R 13/4361 | |
| 11,626,691 | B2 * | 4/2023 | Lim | H01R 13/62938 | 439/372 |
| 2019/0319390 | A1 * | 10/2019 | Damodharan | H01R 13/508 | |
| 2021/0408725 | A1 * | 12/2021 | Lim | H01R 13/62955 | |

* cited by examiner

*Primary Examiner* — Abdullah A Riyami
*Assistant Examiner* — Thang H Nguyen
(74) *Attorney, Agent, or Firm* — Barley Snyder

(57) ABSTRACT

A connector body has a body terminal passageway configured to accommodate a terminal and a block accommodating part configured to communicate with the body terminal passageway. An assembly block is detachably connected to the connector body, rotatable about the connector body while maintaining a state in which the assembly block is connected to the connector body while an external force is applied, and configured to rotate at a predetermined angle or more to be separated from the connector body and be insertable into the block accommodating part.

16 Claims, 10 Drawing Sheets

ELECTRICAL CONNECTOR HAVING TERMINAL POSITION ASSURANCE

CROSS-REFERENCE TO RELATED APPLICATIONS

This application claims the benefit of Korean Patent Application No. 10-2021-0064156 filed on May 18, 2021, and Korean Patent Application No. 10-2022-0046463 filed on Apr. 14, 2022, in the Korean Intellectual Property Office, the entire disclosure of which are incorporated herein by reference.

FIELD OF THE INVENTION

The invention is related to an electrical connector and more particularly to an electrical connector having terminal position assurance features.

BACKGROUND

Electrical connectors are used in various electromechanical devices such as automobiles or home appliances, and used for an electrical and/or physical connection between a plurality of electronic components.

The connector may include a terminal passageway for accommodating a terminal, and a component for fixing the position of the terminal, sometimes referred to as features for terminal position assurance (TPA) or more generically, a TPA. A technology for integrally configuring the TPA in the connector is being developed. There is a need to configure the TPA in the connector as an integral part while reducing the size of the connector.

SUMMARY

A connector body has a body terminal passageway configured to accommodate a terminal and a block accommodating part configured to communicate with the body terminal passageway. An assembly block is detachably connected to the connector body, rotatable about the connector body while maintaining a state in which the assembly block is connected to the connector body while an external force is applied, and configured to rotate at a predetermined angle or more to be separated from the connector body and be insertable into the block accommodating part.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
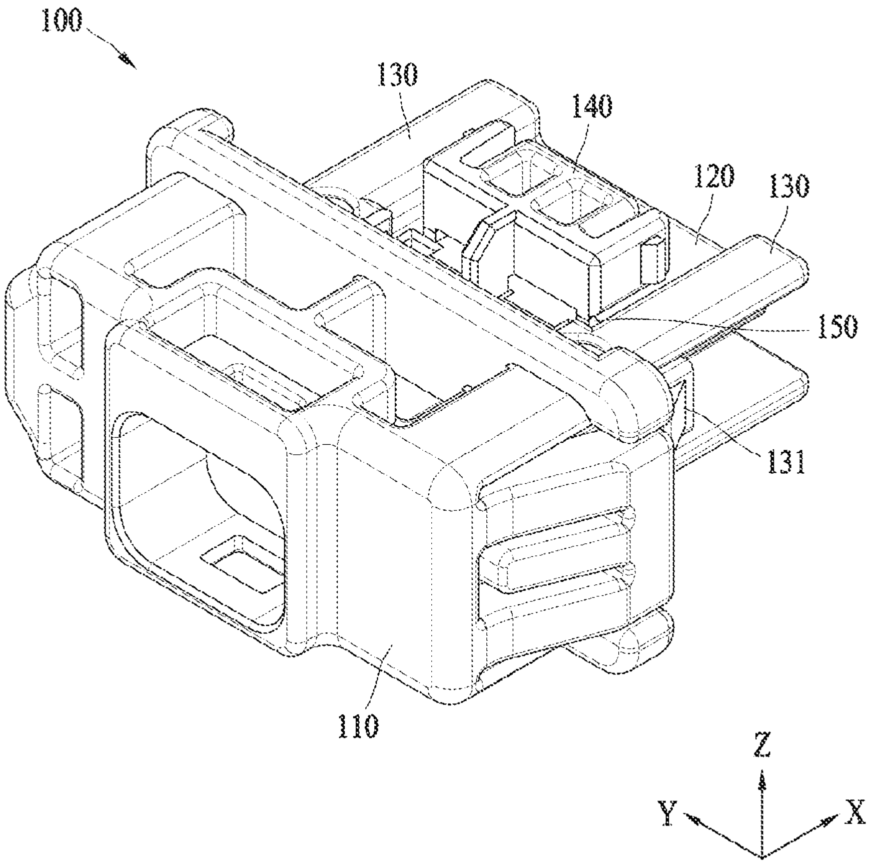
FIG. 1 is a perspective view illustrating a connector according to an exemplary embodiment.

The following structural or functional descriptions of exemplary embodiments described herein are merely intended for the purpose of describing the exemplary embodiments described herein and may be implemented in various forms. However, it should be understood that these exemplary embodiments are not construed as limited to the illustrated forms. Various modifications may be made to the exemplary embodiments. Here, the exemplary embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

A component included in one exemplary embodiment and a component of another exemplary embodiment having a common function will be described using the same name. Unless otherwise stated, descriptions of one exemplary embodiment may be applied to other exemplary embodiments as well, and a repeated description related thereto will be omitted.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, exemplary embodiments will be described in detail with reference to the accompanying drawings. When describing the exemplary embodiments with reference to the accompanying drawings, like reference numerals refer to like components and a repeated description related thereto will be omitted.

Referring to FIG. 1, a connector 100 may accommodate a terminal (not shown), and may fix a position of the terminal in a state in which the terminal is accommodated. The connector 100 may include a TPA for fixing the position of the terminal. The TPA may also be referred to as an assembly block in the present specification. The connector 100 includes a connector head 110, a connector body 120, a key 130, a locking projection 131, an assembly block 140, and a connection leg 150.

The connector head 110 and the connector body 120 accommodate the terminal. The connector head 110 and the connector body 120 may be connected in an X-axis direction. Hereinafter, a +X direction and a −X direction in the present specification will be referred to as front and rear, respectively. In addition, a +Z direction and a −Z direction will be referred to as upward and downward, respectively. The connector body 120 is formed to extend toward the rear of the connector head 110.

The key 130 is provided on at least one of both sides of the connector body 120. For example, a pair of the keys 130 may be provided on both sides, respectively. The key 130 facilitates proper connection of the connector 100 to another electronic device or another connector. For example, the key 130 may include a guide and/or a groove that engages another component to which the connector 100 is to be connected. As can be seen in the drawing, two keys 130 are provided in the shape of a guide on each of the left part (+Y-side part) and the right part (−Y-side part) in the drawing. It should be noted that the exemplary embodiment of the key 130 is not limited thereto.

At least one locking projection 131 may be connected to the key 130. For example, a counterpart (not shown) of the connector 100 may be connected to the connector 100 by a motion in the −X direction. The locking projection 131 keeps the counterpart from being unintentionally separated from the connector 100 while the counterpart is fastened to the connector 100. It should be noted that at least one of the locking projection 131 may be provided, and the number of the locking projections 131 is not limited.

The assembly block 140 is located between the pair of keys 130. The assembly block 140 may be in a central region of the upper surface of the connector body 120. The assembly block 140 may be spaced apart from the pair of keys 130. According to this structure, the connector 100 includes a sufficient space and/or area for installing the pair of keys 130, because the sufficient space and/or area is provided for both the pair of keys 130 and the assembly block 140.

The connection leg 150 temporarily connects the connector body 120 and the assembly block 140. In a state in which no external force is applied, the connector body 120 and the assembly block 140 may be connected by the connection leg 150. At least one connection leg 150 is provided, and the number of the connection legs 150 is not limited. For example, two connection legs 150 may be provided.

Figure 2:
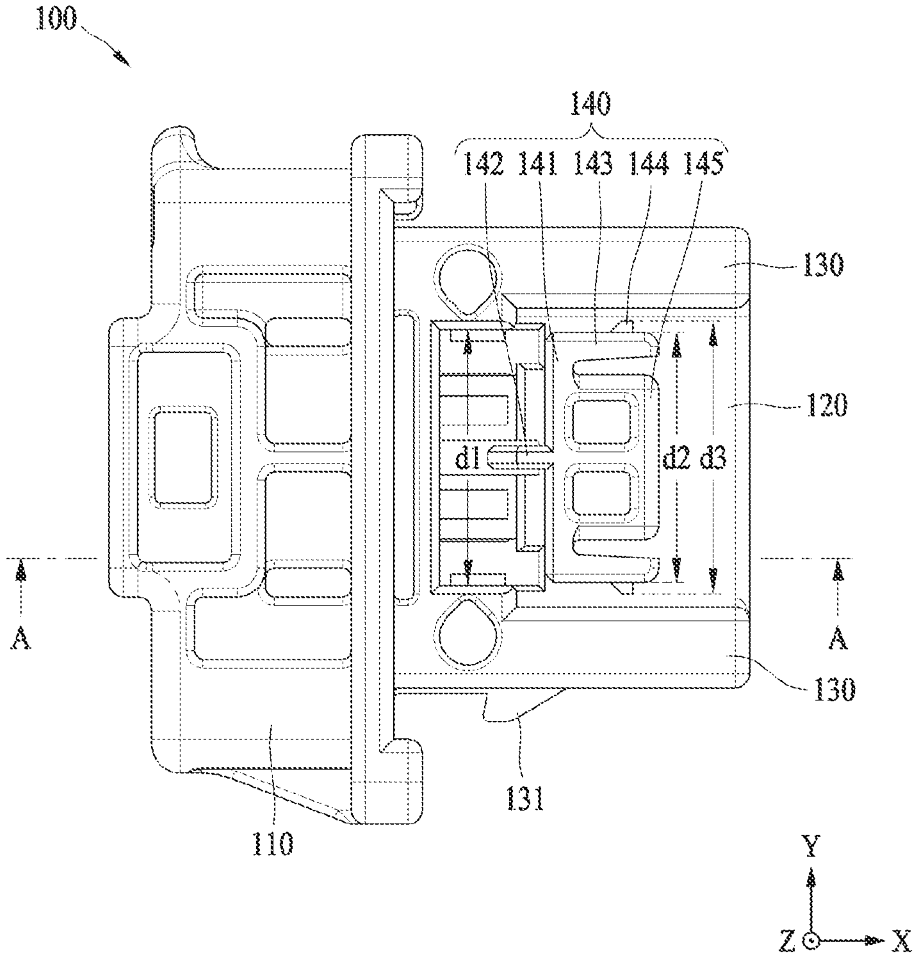
FIG. 2 is a plan view illustrating a connector according to an exemplary embodiment.
Figure 3:
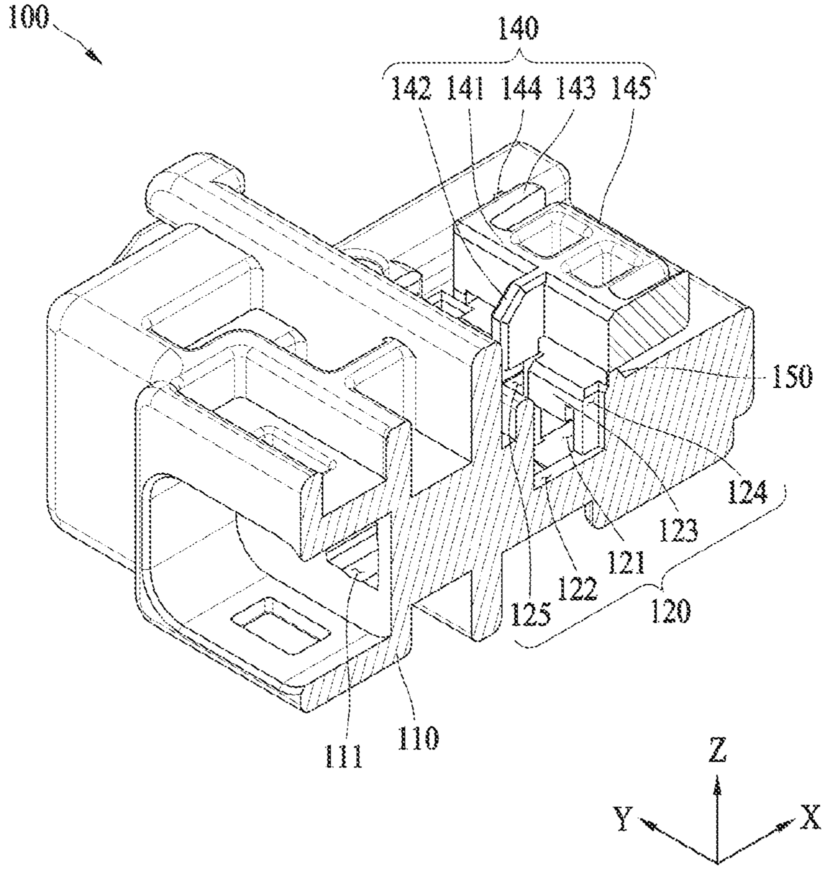
FIG. 3 is a cross-sectional perspective view of the connector taken along the cut line A-A of FIG. 2.

FIG. 2 is a plan view illustrating a connector according to an exemplary embodiment, and FIG. 3 is a cross-sectional perspective view of the connector taken along the cut line A-A of FIG. 2.

Referring to FIG. 2 and FIG. 3, the connector 100 includes the connector head 110, the connector body 120, the key 130, the locking projection 131, the assembly block 140, and the connection leg 150.

The connector head 110 includes a terminal passageway 111 for accommodating a terminal (not shown).

The connector body 120 also includes a body terminal passageway 121 for accommodating the terminal (not shown), a block accommodating part 122 communicating with the body terminal passageway 121, a guide 123 for guiding the assembly block 140, and a space 124. The body terminal passageway 121 is located side by side with the terminal passageway 111 in the X-axis direction. The block accommodating part 122 is located in a central region of the body terminal passageway 121. The block accommodating part 122 is located between the terminal passageway 111 and the body terminal passageway 121.

The block accommodating part 122 receives the assembly block 140. For example, the block accommodating part 122 receives a part of the front of the assembly block 140 when the assembly block 140 is connected to the connector body 120 and contacts the connector body 120. The block accommodating part 122 may receive most of the assembly block 140 in a state in which the assembly block 140 is separated from the connector body 120 and is urged downward along the Z direction. When the assembly block 140 is further urged downward along the Z direction, the block accommodating part 122 may completely receive the assembly block 140.

A pair of the guides 123 are located on the connector body 120. An arm receiving opening 125 is provided between the pair of the guides 123. A main arm 142 is slidable while being accommodated in the arm receiving opening 125. The width of the arm receiving opening 125 may be approximately equal to or greater than the width of the main arm 142.

When the assembly block 140 is separated from the connector body 120, the space 124 may accommodate a part at which the assembly block 140 and the connector body 120 have been connected to each other. For example, the part in which the assembly block 140 and the connector body 120 are connected to each other may be extended and plastically deformed while the assembly block 140 rotates about the connector body 120. When a rotation angle of the assembly block 140 is greater than a predetermined angle, the assembly block 140 and the connector body 120 may be separated from each other. A trace of the connection between the assembly block 140 and the connector body 120 may remain on one surface of the assembly block 140. For example, a particle may remain on one surface of the assembly block 140. Even if the particle remains on one surface of the assembly block 140, the space 124 may accommodate it so that the assembly block 140 can be smoothly inserted into the connector body 120.

The assembly block 140 may be detachably connected to the connector body 120 and therefore temporarily connected to the connector body 120. For example, the assembly block 140 may be in a state where the assembly block 140 is connected to the connector body 120 when no external force is applied to the assembly block 140 or when a relatively small external force is applied. When the user applies an external force in the direction of lifting the rear end of the assembly block 140, the assembly block 140 is rotatable about the connector body 120 (about the Y-axis) while maintaining the state in which the assembly block 140 is connected to the connector body 120.

In a state in which the assembly block 140 is rotated at a predetermined angle, the assembly block 140 contacts the connector body 120. The assembly block 140 may include a contact point contactable to the connector body 120 while being rotated at the predetermined angle with respect to the connector body 120. The contact point may be a point at which the assembly block 140 first contacts the connector body 120 as the assembly block 140 starts to rotate. After the assembly block 140 contacts the connector body 120, the corresponding contact point may function as a rotation center when the external force is continuously applied. In other words, the assembly block 140 is rotatable about the contact point. The external force applied to the connector 100 from the outside may be concentrated on the connection leg 150, and the assembly block 140 may be separated from the connector body 120 when the external force exceeds a threshold.

In a state in which the assembly block 140 is separated from the connector body 120, the assembly block 140 is be positioned side by side with the block accommodating part 122. The assembly block 140 and the block accommodating part 122 are then located side by side with each other along the Z-axis. The assembly block 140 is insertable into the block accommodating part 122. The assembly block 140 is slidable along the connector body 120 once it is separated from the connector body 120.

The assembly block 140 includes a main plate 141, a main arm 142, a side arm 143, a locking protrusion 144, and a block body 145.

The main plate 141 is connected to the connector body 120. The main plate 141 fixes the position of the terminal in a manner that supports the terminal (not shown) while the assembly block 140 is accommodated in the block accommodating part 122. The main plate 141 has a plate shape in which the normal direction faces the front or rear.

The main arm 142 protrudes from the main plate 141 in a first direction toward the front of the connector 100. The main arm 142 may has a contact point that interacts with the arm receiving opening 125 when the external force is applied to the assembly block 140.

The side arm 143 protrudes from the main plate 141 in a second direction opposite to the first direction. In other words, the side arm 143 protrudes toward the rear of the connector 100 from the main plate 141.

The locking protrusion 144 protrudes outward from the side arm 143. The locking protrusion 144 is lockable with the connector body 120 when the assembly block 140 is completely accommodated in the connector body 120.

The assembly block 140 may therefore be inserted and fastened the in the central part of the connector body 120 by the side arm 143 and the locking protrusion 144. According to this structure, the connector 100 has a compact structure because it is unnecessary to provide a structure for connecting the assembly block 140 to the connector body 120 to extend to the outer surface of the connector body 120. For example, when the assembly block has a structure surrounding both sides of the connector body 120, there may not be enough space for the key 130 on both sides of the connector body 120. On the other hand, the connector 100 may sufficiently have a space for the key 130 by implementing the rotation, insertion, and fastening of the assembly block 140 in the central part of the connector body 120. Accordingly, it is possible to provide the space for simultaneously applying the TPA and key functions to the miniaturized connector.

While the assembly block 140 is separated from the connector body 120 and slides downward, the side arm 143 may be resiliently deformed by being pressed inward by the locking protrusion 144. In a state in which the assembly block 140 is completely inserted, the side arm 143 resiles back to its original shape.

The block body 145 extends from the main plate 141 in the second direction and is spaced apart from the side arm 143 in the Y-axis direction. In a state in which the assembly block 140 is completely inserted into the connector body 120, the block body 145 is accommodated such that the upper surface of the connector 100 to has a substantially flat shape. The block body 145 also prevents the side arm 143 from being excessively deformed.

The width of the opening accommodating the assembly block 140 in the connector body 120 has a first length d1. The first length d1 may be longer than a second length d2 which is the length of the width of a pair of the side arms 143. The first length d1 may be shorter than a third length d3 which is the length of the width of a pair of the locking protrusions 144.

The connection leg 150 has a shape that is tapered to thin from the connector body 120 toward the assembly block 140. For example, the thickness of the connection leg 150 is the thinnest along a surface of the assembly block 140. In this case, the separation of the assembly block 140 may be accomplished along that surface of the assembly block 140, and the assembly block 140 will have a relatively smooth surface once separated from the connector body 120.

Figure 4:
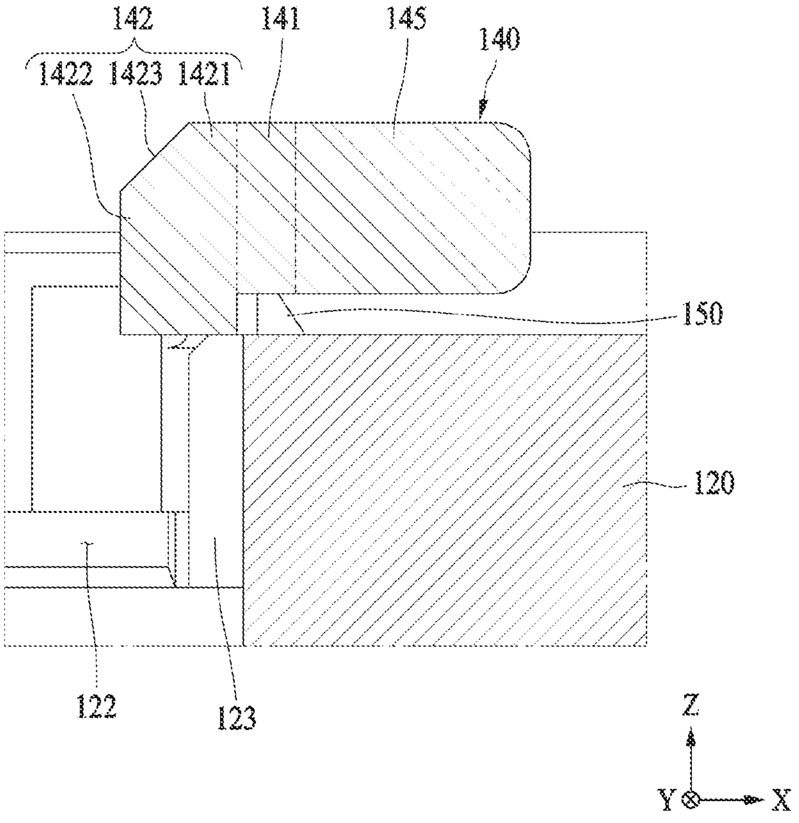
FIG. 4 is a cross-sectional view illustrating an aspect in which an assembly block is connected to a connector body through a connection leg according to an exemplary embodiment.
Figure 5:
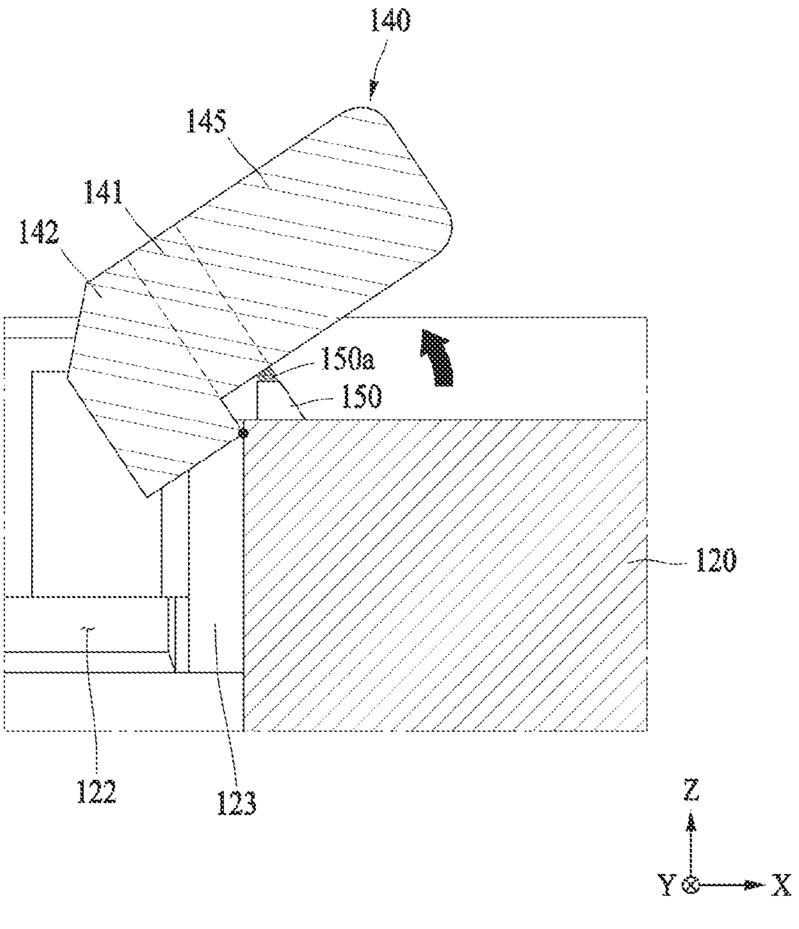
FIG. 5 is a cross-sectional view illustrating an aspect in which the connection leg is deformed due to an external force applied to the assembly block according to an exemplary embodiment.
Figure 6:
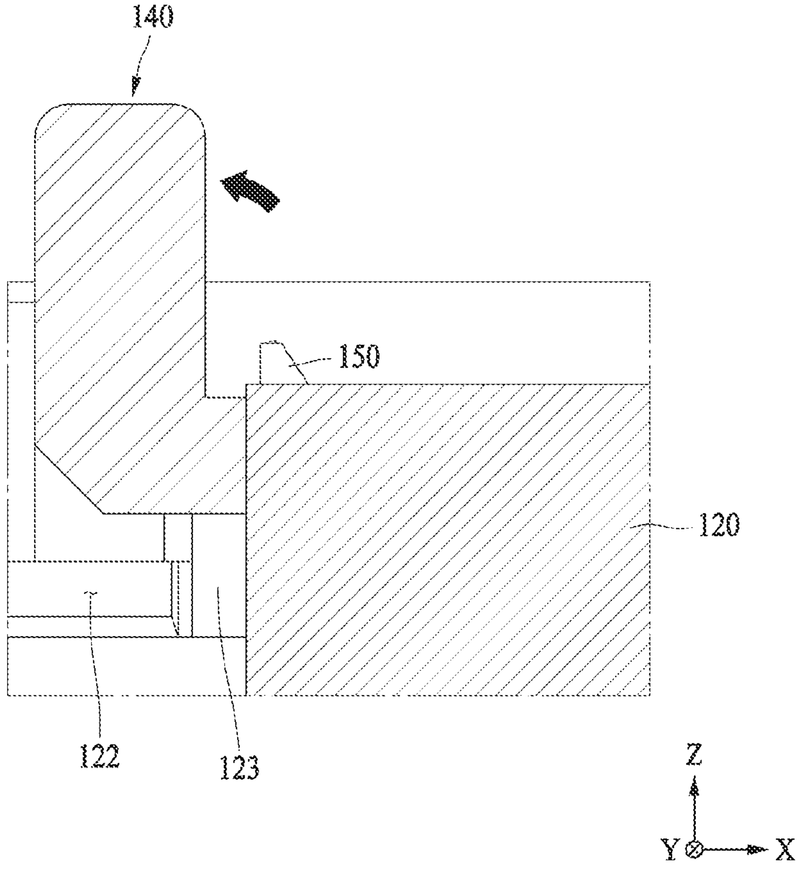
FIG. 6 is a cross-sectional view illustrating a state in which the assembly block is separated from the connector body and a part of the assembly block is inserted into a block accommodating part according to an exemplary embodiment.
Figure 7:
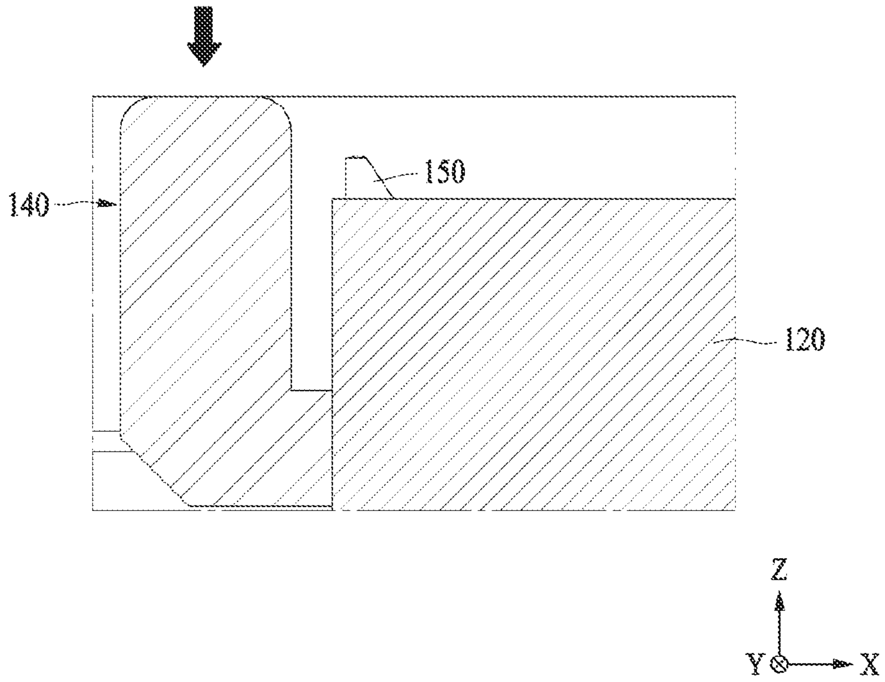
FIG. 7 is a cross-sectional view illustrating a state in which the assembly block is moved in the -z direction while the assembly block is separated from the connector body to be completely inserted into the block accommodating part according to an exemplary embodiment.

FIG. 4 is a cross-sectional view illustrating a state in which an assembly block is connected to a connector body through a connection leg 150 according to an exemplary embodiment. FIG. 5 is a cross-sectional view illustrating a state in which the connection leg 150 is deformed due to an external force applied to the assembly block according to an exemplary embodiment. FIG. 6 is a cross-sectional view illustrating a state in which the assembly block 140 is separated from the connector body and a part of the assembly block 140 is inserted into the block accommodating part according to an exemplary embodiment. FIG. 7 is a cross-sectional view illustrating a state in which the assembly block is moved in the −z direction while the assembly block is separated from the connector body to be completely inserted into the block accommodating part according to an exemplary embodiment.

Referring to FIGS. 4 to 7, the connector body 120 includes the block accommodating part 122 and the guide 123. The assembly block 140 has a main plate 141, a main arm 142, and a block body 145. The guide 123 guides movement of the main arm 142.

The main arm 142 has an arm body 1421 formed to protrude toward the front from the main plate 141, an arm head 1422 protruding downward from the arm body 1421, an inclined surface 1423 formed between the arm body 1421 and the arm head 1422. The arm head 1422 protrudes in a direction toward the block accommodating part 122. The inclined surface 1423 is formed in the front and upper part of the assembly block 140. The inclined surface 1423 may leads the assembly block 140 into the connector body 120 so as not to collide while the assembly block 140 rotates.

Hereinafter, a process in which the assembly block 140 is separated from the connector body 120 will be sequentially described.

First, referring to FIG. 4, the assembly block 140 may be maintained in a state connected to the connector body 120 in a state in which the external force is not applied. For example, the assembly block 140 and the connector body 120 may maintain a connected state by the connection leg 150. For example, in this state, the connection leg 150 is connected to the main plate 141. The connection leg 150 may be formed to protrude either from the connector body 120 or the assembly block 140 toward the other. For example, the connection leg 150 may be formed to protrude from the connector body 120 toward the assembly block 140. The connection leg 150 has a tapered shape in which the thickness gradually decreases in a direction from the connector body 120 toward the assembly block 140. For example, a part of the connection leg 150 adjacent to the connector body 120 has a relatively thick shape, and a part adjacent to the assembly block 140 has a relatively thin shape. Stress is therefore concentrated on a relatively thin part, and the separation of the assembly block 140 occurs in that part. In a state in which no external force is applied, the block accommodating part 122 and the block body 145 in the Z-axis direction do not overlap each other.

Next, referring to FIG. 5, when an external force is applied, the assembly block 140 is urged to rotate about the Y-axis. The user may rotate the assembly block 140 in a manner that lifts the rear end of the assembly block 140 upward. The assembly block 140 contacts the connector body 120 at the contact point. While the assembly block 140 is rotated, some of the connection leg 150 is initially deformed. For example, the connection leg 150 may be plastically deformed. In a state in which the connector body 120 and the assembling block 140 are in contact at the contact point, at least part of the block body 145 overlaps the block accommodating part 122 in the Z-axis direction.

Next, referring to FIG. 6, the assembly block 140 is separated from the connection leg 150. The assembly block 140 is now side by side with the block accommodating part 122. The guide 123 positions the main arm 142. The assembly block 140 is slidable in a state provided side by side with the block accommodating part 122.

Finally, referring to FIG. 7, the assembly block 140 is urged downward along the connector body 120.

Figure 8:
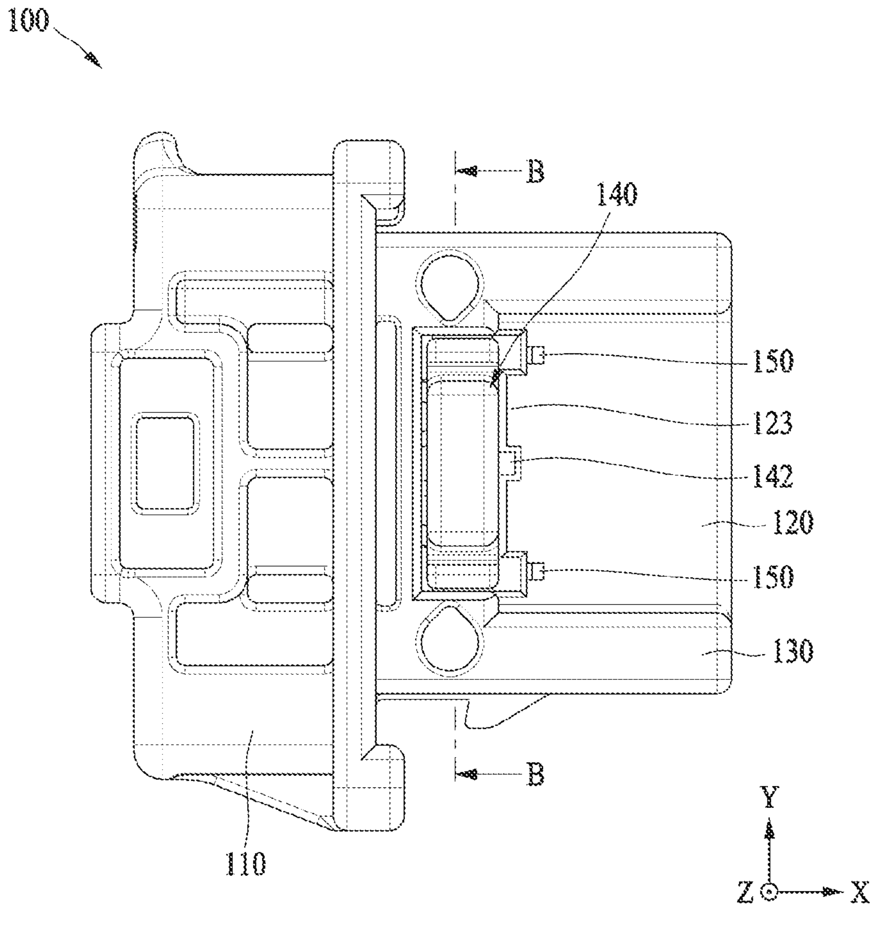
FIG. 8 is a plan view of a connector according to an exemplary embodiment.
Figure 9:
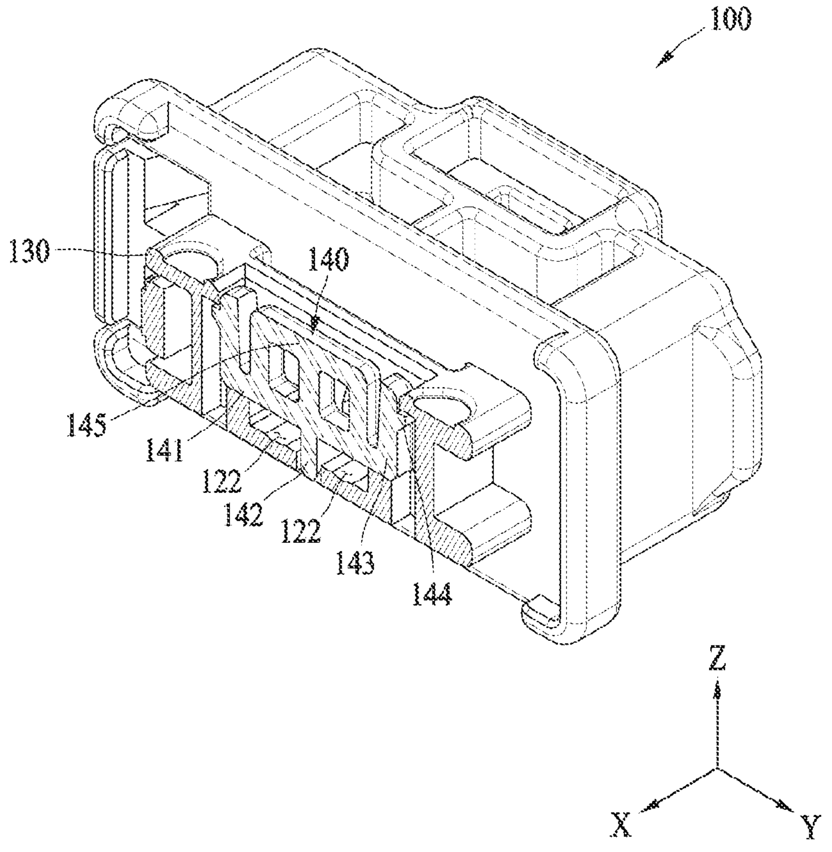
FIG. 9 is a cross-sectional perspective view of the connector taken along the cut line B-B of FIG. 8.

Referring FIG. 8 and FIG. 9, the connector body 120 may include a accommodating part for accommodating the end of the main arm 142 in a state in which the assembly block 140 is completely assembled. For example, the shape of the accommodating part may be a groove or an opening.

In a state in which the assembly block 140 is completely assembled to the connector body 120, the locking protrusion 144 is lockable to the connector body 120. The main plate 141 fixes the terminal to assure its position. The main plate 141 may reduce the area of the block accommodating part 122. The main plate 141 also prevent the terminal engaged in the connector 100 from being unintentionally removed from the connector 100.

Figure 10:
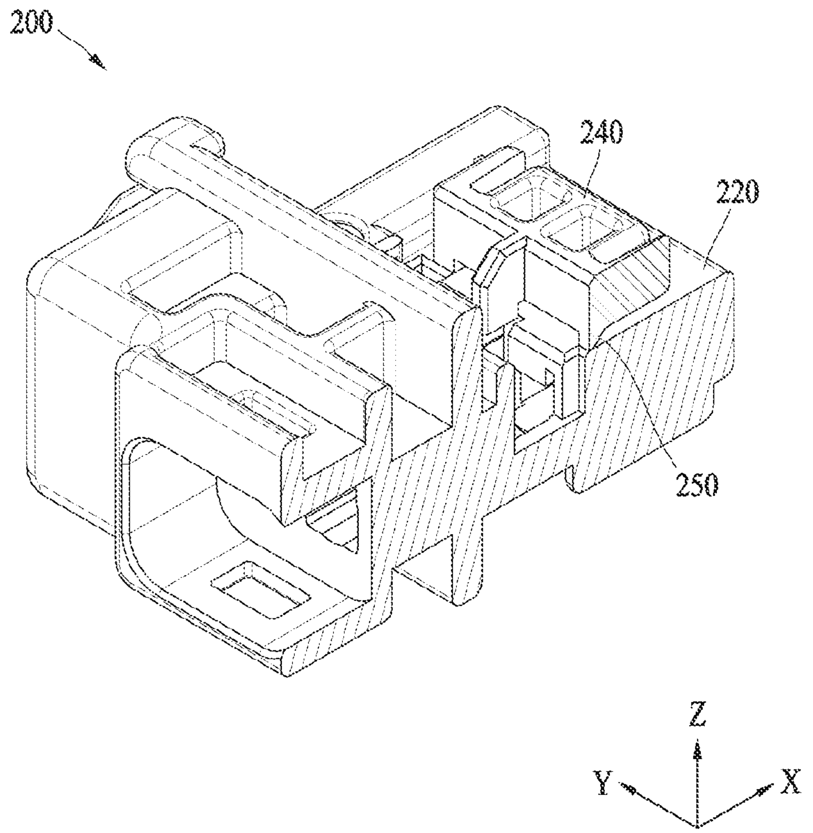
FIG. 10 is a cross-sectional perspective view of a connector according to another exemplary embodiment.

FIG. 10 is a cross-sectional perspective view illustrating a connector according to another exemplary embodiment.

Referring to FIG. 10, a connection leg 250 protrudes from an assembly block 240 toward a connector body 220 and has an end connected to the connector body 220. For example, a part of the connection leg 250 connected to the assembly block 240 may be relatively thick, and a part connected to the connector body 220 may be relatively thin. According to this structure, the upper surface of the connector body 220 may be smooth when the assembly block 240 is separated from the connector body 220.

For example, the connection leg 250 has a tapered shape that becomes thinner from the assembly block 240 toward the connector body 220. For example, the thickness of the connection leg 250 may be the thinnest on one surface of the connector body 220. In this case, the separation of the assembly block 240 will be implemented near one surface of the connector body 220, and the connector body 220 will have a relatively smooth surface when the assembly block 240 is separated.

According to exemplary embodiments, it is possible to implement a compact structure by implementing separation of an assembly block and sliding of the assembly block together with rotation of the assembly block, rather than simple rotation of the assembly block.

As described above, although exemplary embodiments have been described with reference to the drawings, it will be apparent to one of ordinary skill in the art that various changes in form and details may be made in these exemplary embodiments without departing from the spirit and scope of the claims and their equivalents. Suitable results may be achieved if the described techniques are performed in a different order, and/or if components in a described system, architecture, or device are combined in a different manner and/or replaced or supplemented by other components or their equivalents.

What is claimed is:

1. A connector comprising:

a connector body comprising a body terminal passageway configured to accommodate a terminal and a block accommodating part configured to communicate with the body terminal passageway;

an assembly block detachably connected to the connector body, rotatable about the connector body while maintaining a state in which the assembly block is connected to the connector body while an external force is applied, and configured to rotate at a predetermined angle or more to be separated from the connector body and be insertable into the block accommodating part;

a connection leg configured to connect the connector body and the assembly block; and a space configured to accommodate a part at which the assembly block and the connector body have been connected to each other when the assembly block is separated from the connector body.

2. The connector of claim 1, wherein the assembly block comprises a contact point contactable to the connector body in a state where the assembly block rotates at a predetermined angle with respect to the connector body.

3. The connector of claim 2, wherein the assembly block is rotatable about a contact point.

4. The connector of claim 2, wherein the assembly block is slidable along the connector body in a state where the assembly block is separated from the connector body.

5. The connector of claim 1, wherein the assembly block comprises:

a main plate connected to the connector body; and a main arm protruding from the main plate and contactable with the connector body.

6. The connector of claim 5, wherein the main arm comprises an arm body protruding from the main plate, and an arm head protruding from the arm body toward the block accommodating part and contactable with the connector body.

7. The connector of claim 6, wherein the main arm further comprises an inclined surface located between the arm body and the arm head.

8. The connector of claim 6, wherein the connector body further comprises a guide configured to guide movement of the main arm.

9. The connector of claim 5, wherein the assembly block comprises:

a side arm protruding from the main plate; and a locking protrusion protruding from the side arm and lockable with the connector body in a state where the assembly block is accommodated in the block accommodating part.

10. The connector of claim 9, wherein the side arm is elastically deformable.

11. The connector of claim 1, further comprising a key located on a side of the connector body.

12. The connector of claim 1, further comprising a connection leg configured to connect the connector body and the assembly block.

13. The connector of claim 12, wherein the connection leg has a tapered thickness that thins from the connector body toward the assembly block.

14. The connector of claim 12, wherein the connection leg has a tapered thickness that thins from the assembly block toward the connector body.

15. A connector comprising:

a connector body comprising a body terminal passageway configured to accommodate a terminal and a block accommodating part configured to communicate with the body terminal passageway;

an assembly block detachably connected to the connector body, rotatable about the connector body while maintaining a state in which the assembly block is connected to the connector body while an external force is applied, and configured to rotate at a predetermined angle or more to be separated from the connector body and be insertable into the block accommodating part; and a space configured to accommodate a part at which the assembly block and the connector body have been connected to each other when the assembly block is separated from the connector body.

16. A connector comprising:

a connector body comprising a body terminal passageway configured to accommodate a terminal and a block accommodating part configured to communicate with the body terminal passageway; and an assembly block detachably connected to the connector body, rotatable about the connector body while maintaining a state in which the assembly block is connected to the connector body while an external force is applied, and configured to rotate about an axis normal to a direction of insertion of the terminal into the body terminal passageway and at a predetermined angle or more to be separated from the connector body and be insertable into the block accommodating part.

* * * * *